(12) United States Patent
Hennessey

(10) Patent No.: US 6,666,427 B2
(45) Date of Patent: Dec. 23, 2003

(54) STAND BASE HAVING MODIFIED HEXAGONAL CONFIGURATION

(76) Inventor: James R. Hennessey, 7 Sunrise Hill Dr., West Hartford, CT (US) 06107

( * ) Notice: Subject to any disclaimer, the term of this patent is extended or adjusted under 35 U.S.C. 154(b) by 0 days.

(21) Appl. No.: 09/862,938

(22) Filed: May 22, 2001

(65) Prior Publication Data

US 2002/0175260 A1 Nov. 28, 2002

(51) Int. Cl.⁷ .............................................. F16M 13/00
(52) U.S. Cl. ................................. 248/523; 248/125.8
(58) Field of Search ................................. 248/523, 910, 248/346.04, 519, 161, 125.8; 84/327

(56) References Cited

U.S. PATENT DOCUMENTS

| | | | | | |
|---|---|---|---|---|---|
| 2,226,209 | A | * | 12/1940 | Rizzuto | 108/139 |
| 2,502,667 | A | * | 4/1950 | Pagett | 248/161 |
| 3,342,147 | A | * | 9/1967 | Shettles | 108/185 |
| 3,423,781 | A | * | 1/1969 | Henson | 15/145 |
| 3,655,156 | A | * | 4/1972 | Petrie | 248/188.7 |
| 3,856,253 | A | * | 12/1974 | Seebinger | 248/411 |
| 4,212,219 | A | * | 7/1980 | Hubbard | 84/379 |
| 4,591,126 | A | * | 5/1986 | Berney | 248/524 |
| 4,793,611 | A | * | 12/1988 | Thornell | 16/343 |
| 5,014,461 | A | * | 5/1991 | von Braucke et al. | 248/523 |
| 5,046,693 | A | * | 9/1991 | Browne | 248/159 |
| D327,901 | S | * | 7/1992 | Chen | 84/421 |
| 5,393,166 | A | * | 2/1995 | Stock et al. | 404/14 |
| 5,497,965 | A | * | 3/1996 | Mathieu, Jr. | 248/159 |
| 5,791,626 | A | * | 8/1998 | Reese | 248/523 |
| 5,833,199 | A | * | 11/1998 | Benting et al. | 248/414 |
| 5,893,541 | A | * | 4/1999 | Michaelson | 248/158 |
| 6,105,194 | A | * | 8/2000 | Rudolph | 15/143.1 |
| 6,199,805 | B1 | * | 3/2001 | Pena | 248/125.8 |

* cited by examiner

*Primary Examiner*—Ramon O. Ramirez
(74) *Attorney, Agent, or Firm*—Ira S. Dorman

(57) ABSTRACT

A microphone stand assembly utilizes a low profile base of modified hexagonal peripheral configuration, and a screw-in shaft of adjustable height. A coarse thread affords durability and facilitates assembly and disassembly, and an anti-rotation arrangement cooperates with the base construction to provide stability and convenience of use.

4 Claims, 3 Drawing Sheets

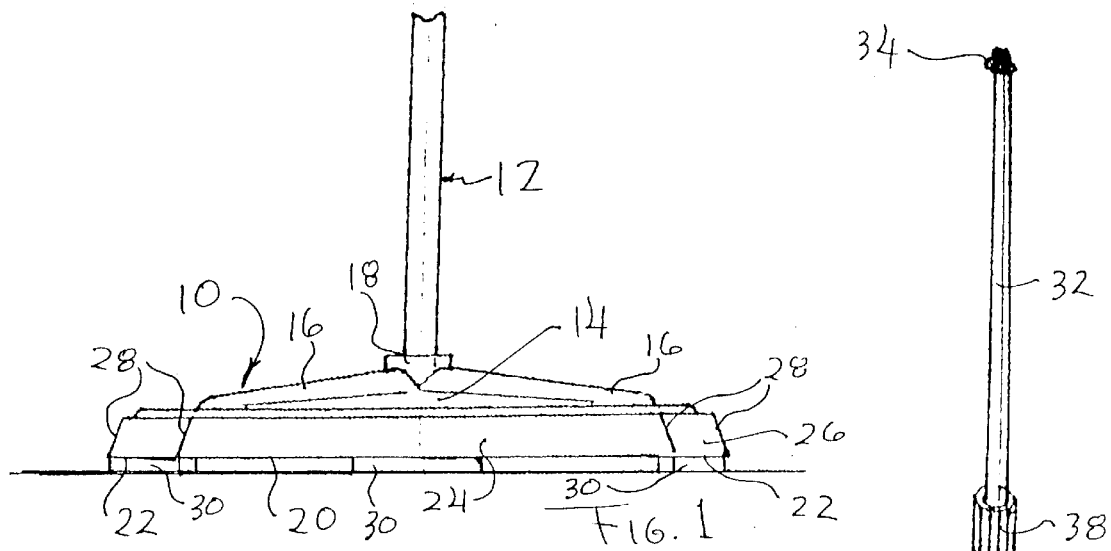
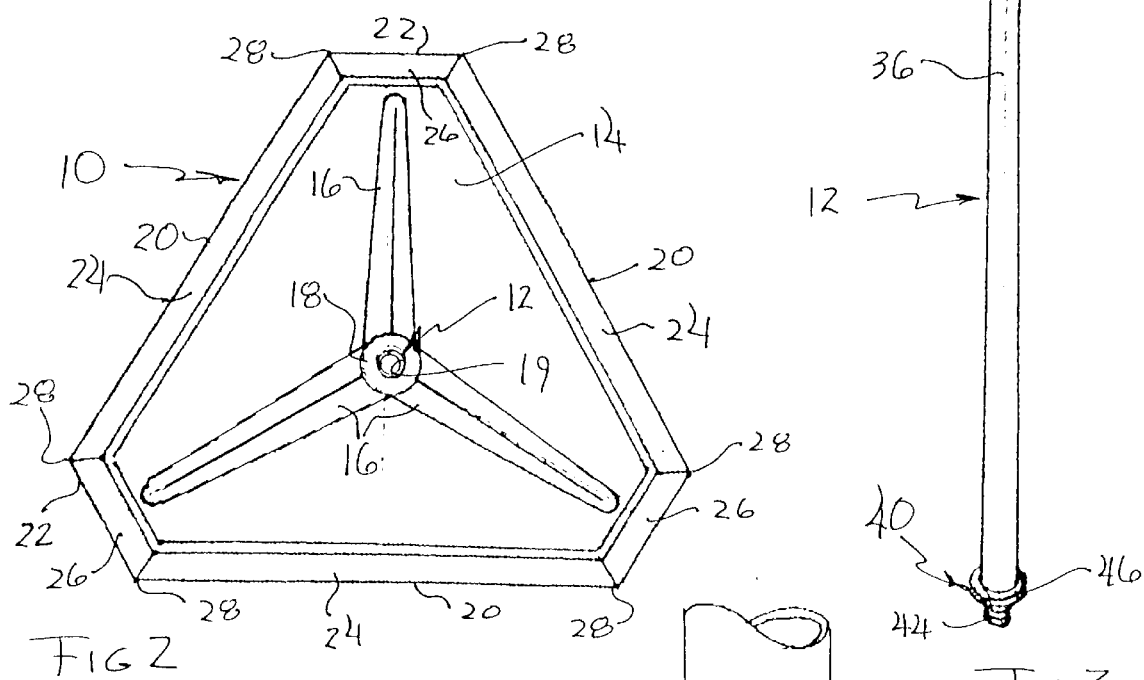
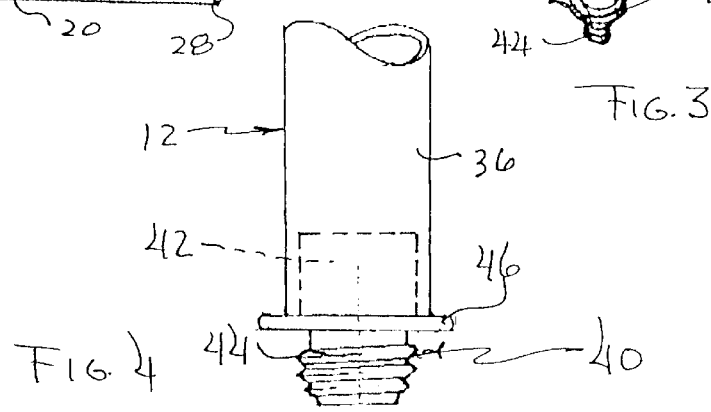

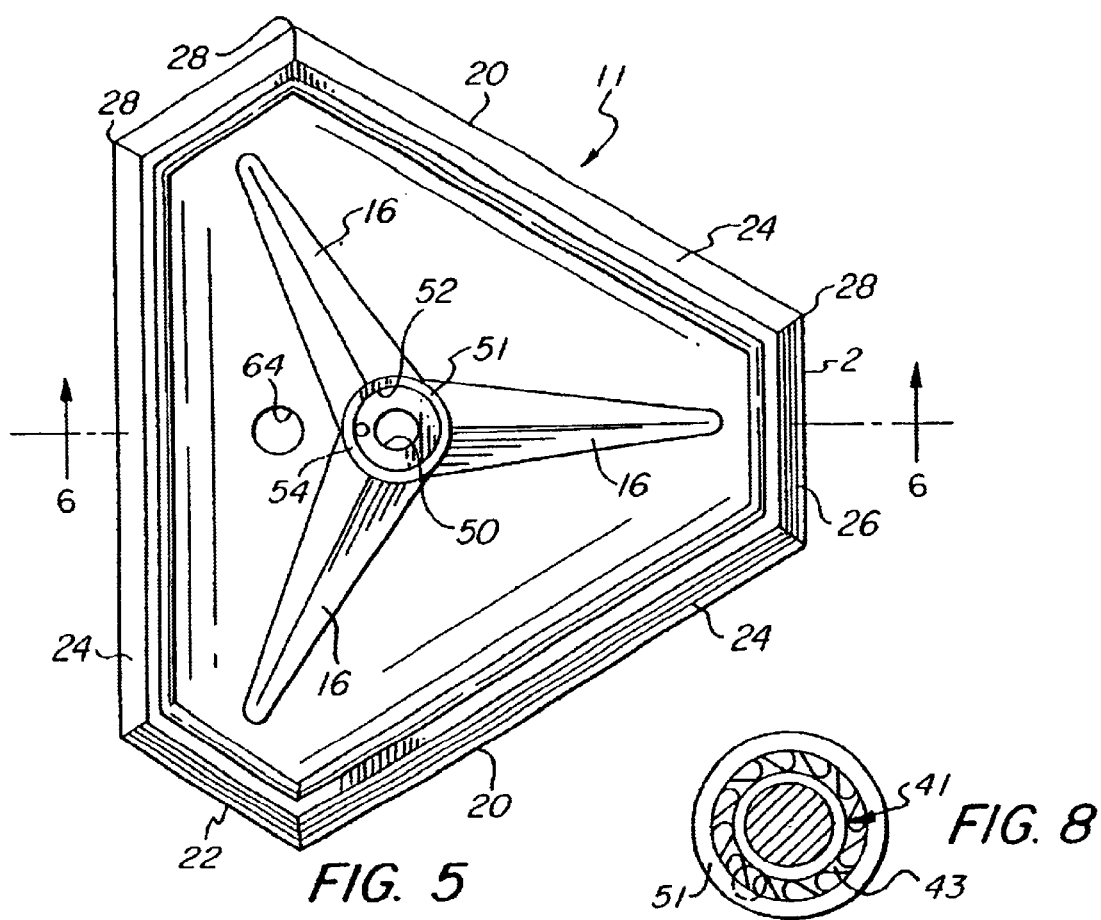
FIG. 5
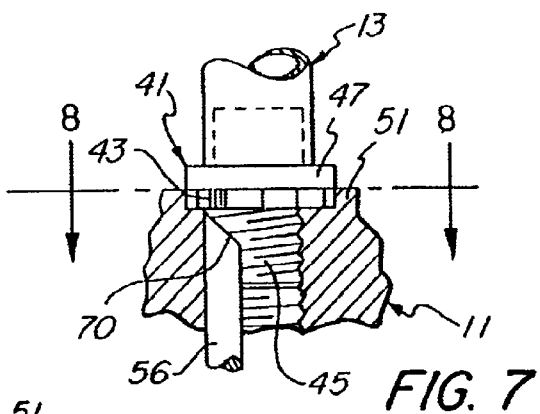
FIG. 8
FIG. 7
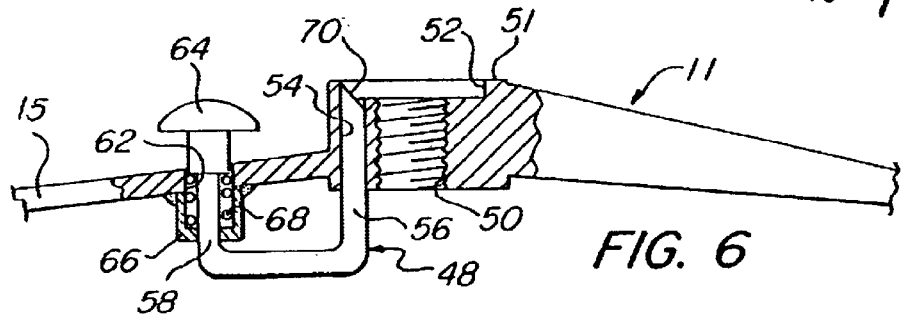
FIG. 6

STAND BASE HAVING MODIFIED HEXAGONAL CONFIGURATION

BACKGROUND OF THE INVENTION

A wide variety of stands are utilized in the entertainment industry, as well as in other fields, for supporting microphones ("mics"), speakers, lighting, musical instruments, music scores, etc. The industry standard for a mic stand employs a round, sand-cast base that measures about 10 inches in diameter and weighs about six pounds, with which a shaft is threadably assembled. The shaft will usually consist of two telescoping tubular sections operatively interengaged by a center clutch for permitting height adjustment, the most widely used form of clutch being operated by rotation of a collar attached to the lower shaft section.

The conventional round-base stands suffer from a number of deficiencies, primary amongst which is inadequate stability. Because these stands usually employ a number of discrete, floor-contacting elements distributed under the edge of the base, downward force (e.g., by users stepping on the base of the stand), particularly in areas lying outwardly of the secants between adjacent contact elements, will tend to cause the stand to tip. Also, the upper marginal structure surrounding the base is typically of such form that downward forces tend to produce pivotal moments, thereby contributing to instability, and the relatively high profile and uniform metal thickness in the conventional base structure do not afford an optimal center of gravity or weight distribution.

Exacerbating these factors is the preference of many performers to stand in close proximity to a supported microphone. Not only does the standard round base inhibit such close approach, by not readily accommodating the user's feet, but it also prevents the close lateral stacking of a number of microphones (or other equipment) that is frequently desired on stage and in the studio.

The threading features, and indeed, the basic screw-together nature of the conventional stand assembly, also give rise to difficulties. First of all, because the clutch on the shaft is commonly designed for release by rotating a collar (invariably, in the same direction as that in which the shaft is unscrewed from the base), there is a chronic tendency for loosening to occur during normal use. Due to the fineness of the threads utilized, moreover, not only is interengagement of the shaft and the base difficult and time-consuming (both because it is hard to properly align the parts from a standing position with the base resting on the floor, and also because many revolutions of the shaft are required for full tightening), but furthermore the threads themselves are frequently damaged due to crossing or misalignment, or simple physical impact.

SUMMARY OF THE INVENTION

Accordingly, it is a broad object of the present invention to provide a novel base for a stand, and a novel stand assembly utilizing such a base, wherein a high degree of stability is afforded and close approach and facile lateral stacking are enabled.

It is also an object of the invention to provide such a base and stand assembly wherein assembly and disassembly are relatively quick and easy, and wherein tendencies for damage to occur to component parts, and especially to thread elements, are significantly reduced.

It has now been found that certain of the foregoing and related objects of the invention are attained by the provision of a ground-engaging base comprised of a low-profile base member of modified hexagonal peripheral configuration. The base member is symmetrical about each of three axes mutually angularly spaced by 120°, and the peripheral configuration is comprised of three longer edges, of a first length, and three interposed shorter edges, of a second length, one of the longer edges and an opposing shorter edge lying substantially perpendicular to each of the axes.

The ratio of the first length to the second length (i.e., of the longer and shorter edges, respectively) should be about 2.5:1 to 4.5:1, preferably about 3:1 to 4:1, and most desirably about 3.5:1. In most instances a multiplicity of ground-engaging elements will project downwardly beneath a bottom plane of the base, one of which elements is disposed substantially at each of the apices at which the peripheral edges intersect. Although a discrete piece may provide each ground-engaging element, preferably an elongate foot piece will extend along the periphery of the base member, adjacent each of the shorter edges, to provide a pair of such elements.

The upper marginal structure extending along each of the longer peripheral edges (and usually along the shorter edges as well) will beneficially be inwardly bevelled to minimize the likelihood that downward force thereupon will cause tipping of the base. The topside of a web portion of the base member (i.e., the interior portion, surrounded by the peripheral edges and the marginal structure) will advantageously be formed with a raised ridge structure extending outwardly, along each of the three 120° angularly spaced axes, from adjacent the intersection of the axes to a location proximate the corresponding one of the shorter edges. Such ridge structures will desirably be of generally inverted V-shaped cross section and tapered in the outward direction, thereby adding to the mass of the base member and providing a weight distribution that contributes substantially to stability.

Other objects of the invention are attained by the provision of a stand assembly comprised of a ground-engaging base, as herein described, a shaft, and means for attaching the shaft to the base. The means for attaching will generally take the form of a normally upwardly opening aperture (i.e., an aperture that opens upwardly when the base is resting on the ground) defined in the base member substantially at the intersection of the 120° axes, in combination with an end portion of the shaft that is dimensioned and configured for engagement within the aperture.

In one preferred embodiment, the end portion of the shaft and the sidewall of the base member aperture will be matingly threaded with a pitch that provides no more than four, and more advantageously fewer than three, threads per inch. The threaded end portion of the shaft will most desirably be provided on a solid metal plug affixed to a length of metal tubing comprising the shaft. In especially preferred embodiments the stand assembly will include anti-rotation means, such as a foot-operated ratchet mechanism, for releasably interengaging the shaft against unscrewing from the base member.

Alternative attaching means may comprise a locking arrangement having features that permit shaft insertion in one orientation relative to the base, and that lock the shaft in a second orientation, the respective shaft orientations being displaced from one another by an angular distance no greater than one-half turn of the shaft, and preferably no greater than one-quarter turn. Such a locking arrangement may comprise a continuous groove extending along the sidewall of the base member aperture, and a stud projecting laterally (i.e., radially) from the shaft and dimensioned and configured for slidable engagement in the groove. An entrance section of the groove extends inwardly into the base member from the mouth of the aperture, and a blind section of the groove, connected to an inner end of the entrance section, extends generally outwardly toward the aperture mouth but terminates short thereof; the groove may, for example, advantageously be of generally J-shaped configuration.

BRIEF DESCRIPTION OF THE DRAWINGS

FIG. 1 is a fragmentary side elevational view of a stand assembly embodying the present invention;

FIG. 2 is a plan view of the assembly of FIG. 1;

FIG. 3 is a perspective view of an extensible shaft suitable for use as a component of the stand assembly;

FIG. 4 is a fragmentary side elevational view of the bottom end portion of the shaft of FIG. 3, drawn to a greatly enlarged scale;

FIG. 5 is a plan view of a second form of stand base embodying the present invention;

FIG. 6 is a fragmentary view of the base of FIG. 5, shown in partial section;

FIG. 7 is a fragmentary sectional view of the base of FIG. 6, with which is assembled a fragmentarily illustrated shaft, only the lower end portion of which is shown;

FIG. 8 is a top view of the assembly of FIG. 7, taken along line 8—8 thereof;

DETAILED DESCRIPTION OF THE PREFERRED AND ILLUSTRATED EMBODIMENTS

Figure 9:
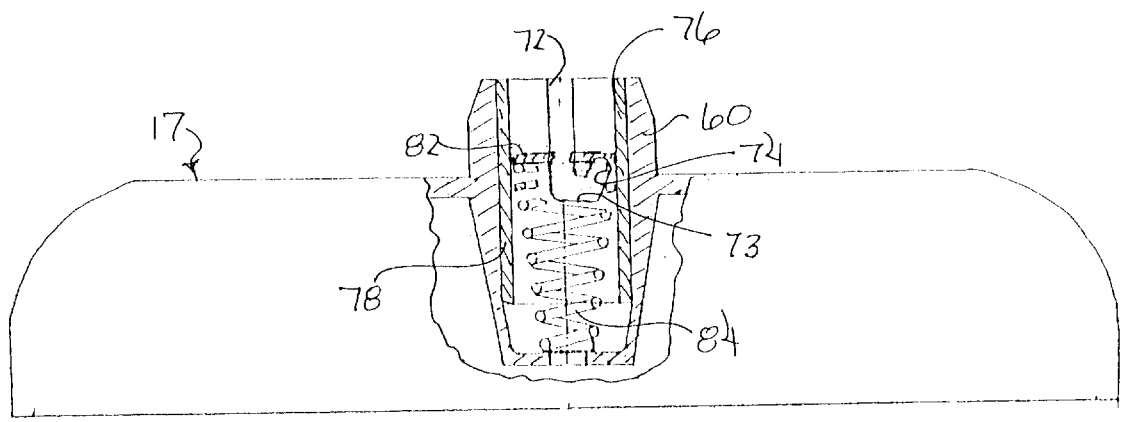
FIG. 9 is an elevational showing a further form of stand base, with a portion broken away to expose internal features.

Turning initially to FIGS. 1 and 2 of the drawings, therein illustrated is a stand assembly embodying the present invention and consisting of a base, generally designated by the numeral 10, and a post or shaft generally designated by the numeral 12. The base comprises a base member of modified hexagonal peripheral configuration, including an interior web portion 14 having three upwardly projecting raised ridges 16 thereon, the ridges extending radially from a circular hub portion 18 at 120° angular intervals. Each ridge 16 is of inverted V-shaped cross section and tapers (in both height and width) in an outward direction relative to the hub portion 18.

The periphery of the base member is defined by three relatively long edges 20 and three interposed relatively short sections 22, with corresponding marginal surfaces, 24 and 26 respectively, which are inwardly and upwardly inclined (in the normal disposition of the stand assembly). The adjacent edges 20, 22, and the marginal surfaces 24, 26, intersect at apices 28, and each of the longer edges 20 and a parallel opposing shorter edge 22 extends perpendicular to the axis on which one of the raised ridges 16 is disposed. Thus, the base member is symmetrical about each of three axes, mutually spaced by 120°.

The base 10 also includes three elongated, bar-like feet 30 of rectangular cross section, typically fabricated from a durable natural or synthetic rubbery material and extending along substantially the length of each shorter edge 22 of the base member in underlying, directly adjacent relationship thereto. Each foot 30 therefore extends effectively between two adjacent apices 28 on the periphery of the base member and provides a floor-engaging element thereat, and each ridge 16 bisects one of the feet 30, contributing to a desirable weight distribution.

The shaft 12 of the stand assembly consists of a smaller diameter (usually ⅝" I.D.) tubular section 32 having a coupling piece 34 at its upper end, and a larger diameter (usually ⅞" I.D.) tubular section 36 in which section 32 is telescopically received, the sections 32, 36 normally being fabricated from lengths of steel tubing. A conventional friction clutch arrangement, including rotating collar 38, is provided at the upper end of the section 36 for maintaining the position of extension of the inner section 32 relative thereto. A solid plug, generally designated by the numeral 40 and normally also made of steel, includes a cylindrical stub portion 42 received within the lower end of the tubular member 36 and affixed thereto (as by welding), a threaded engagement portion 44, and an annular flange portion 46 disposed therebetween and abutted against the end of the tubular section 36. The threaded portion 44 of the plug 40 is typically one inch long and $^{11}/_{16}$ inch in diameter, and provides the means for assembling the shaft 12 with the base 10, the hub portion 18 of which is of course formed with a threaded, axially extending aperture 19 for that purpose.

It is to be noted that the threads on the engagement portion 44 of the plug 40 and (albeit not shown) on the sidewall of the aperture 19, are large and coarse, typically providing fewer than four, and preferably fewer than three, threads per inch. This is to be contrasted with conventional components, which normally provide 27 threads per inch (American standard) formed directly upon the end of the tubular member, and greatly facilitates assembly and disassembly while contributing to durability. Specifically, the components can be assembled "blindly" and from a standing position, without need to hold them for close inspection so as to avoid misalignment, and the likelihood of damaging the threads, by crossing them or through impact, is reduced (not only because the threads are coarse but also because they are provided on a solid metal plug).

The stand assembly depicted in FIGS. 5 through 8 incorporates means for locking the shaft against rotation relative to the base so as to prevent inadvertent loosening of the shaft, which tends to occur when the shaft sections are secured by a clutch mechanism having a rotating operating collar 38, as illustrated in FIG. 3. As will be appreciated, the clutch is such that release is effected by turning the collar 38 in the direction in which the shaft itself is unscrewed from the base.

More particularly, and as is best seen in FIG. 6, the locking mechanism is mounted on the base member, generally designated by the numeral 11, and consists of a U-shaped operating rod, generally designated by the numeral 48, having a longer arm 56 and a shorter arm 58. The longer arm 56 extends through a small hole 54 adjacent and parallel to the threaded aperture 50 in the hub portion 51 of the base member 11, and the shorter arm 58 extends through a small cup-like housing 66, welded to the underside of the web portion 15, and an overlying hole 62. A cap or bolt head 64 is threadably engaged on the end of the shorter arm 58, to effectively provide a foot pedal for operating the locking mechanism, and the rod 48 is biased toward a raised position by coil spring 68 (shown broken away), which is contained within the housing 66 and bears upon the end wall thereof and the bottom of the bolt head 64. The passage 54 opens to a shallow annular recess 52 formed concentrically with the aperture 50 in the hub portion 51, and the upper end of the arm 56 is bevelled at 45° to provide a substantially flat face 70 oriented generally parallel to radii from the axis of the aperture 50.

As is best seen in FIGS. 7 and 8, a plug insert, generally designated by the numeral 41, is affixed within the bottom end of the shaft generally designated 13, and includes a ratchet wheel 43 disposed between the threaded end portion 45 and the annular flange 47. As will be appreciated, when the U-shaped rod 48 is in its elevated position (as depicted in FIG. 6) the tip of the arm 56 is disposed within the recess 52. The bevel of the flat face 70 thereon, and the resilient deflectability of the rod 48, enable rotation of the ratchet wheel 43, and hence rotation of the shaft 13, in only one direction; i.e., the wheel 43 rides over the face 70 when the shaft is rotated in the clockwise direction (as viewed in FIG. 8), whereas the teeth of the wheel 43 catch behind the upper shoulder on the tip of the arm 56 when rotation in the opposite direction is attempted. Downward force upon the bolt head 64 will of course retract the arm 56 to a position sufficiently below the ratchet wheel 43 as to permit counterclockwise rotation of the shaft 13, thereby enabling disassembly from the base when desired.

Figure 10:
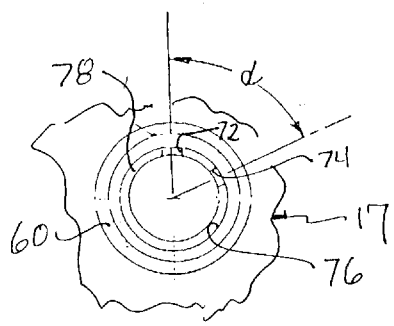
FIG. 10 is a fragmentary plan view of the base of FIG. 9.
Figure 11:
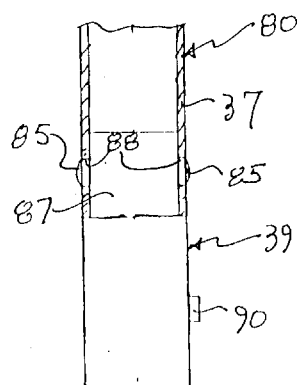
FIG. 11 is a fragmentary elevational view, in partial section, showing a shaft suitable for use with the base of FIGS. 9 and 10.

An alternative anti-rotation arrangement is depicted in FIGS. 9 through 11. The hub portion 60 of the base member, generally designated 17, provides an upwardly opening well 76, which is of uniform circular cross section along most of its length but tapers slightly at the bottom. A metal sleeve 78 is affixed within the well 76 and is routed to form a J-shaped slot comprised of a relatively long, axially extending leg 72, a relatively short inclined leg 74 (blind at its upper end, and not therefore actually visible, as is otherwise suggested in FIG. 10 for the sake of illustration), and a circumferential connecting section 73. A bearing disc 82 (a small portion of which is broken away) is slidably received within the sleeve 78 and is biased upwardly by a coil spring 84 (also shown partially broken away), the spring acting thereupon and upon the end wall of the hub portion 60.

The cooperating shaft, depicted in FIG. 11 and generally designated by the numeral 80, consists of a tubular section 37 and a solid plug generally designated by the numeral 39; although not shown in this Figure, it will be appreciated that the shaft 80 will normally include a telescopically received upper section and an operatively interposed clutch mechanism, as previously described. The insert portion 87 of the plug 39 is fitted with a pair of oppositely directed, spring-loaded detents 85, which are positioned to engage within small holes 88 formed diametrically through the wall of the tubular section 37, and a stud 90 extends radially from a location between the opposite ends of the plug.

The shaft 80 is assembled with the base 17 by inserting the plug 39 into the sleeve 78, the stud 90 being aligned with the longer leg 72 of the J-shaped slot to permit introduction. The bearing disc 82 is displaced downwardly by the shaft against the force of the coil spring 84; when the stud 90 reaches the circumferential section 73 at the bottom of the leg 72, the shaft 80 can be rotated slightly to align the stud 90 with the angled shorter leg 74. Upon relief of downward force the lug 90 slides obliquely upwardly into the leg 74 (to assume an orientation offset by an angle α relative to the orientation of introduction), thereby locking the shaft against rotation in both directions. The manner of shaft disassembly is of course self-evident.

Figure 12:
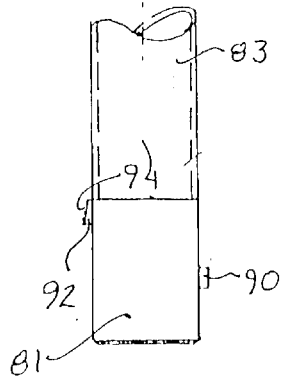
FIG. 12 is a fragmentary view showing the bottom end portion of a modified form of shaft, similar to the shaft of FIG. 11.
Figure 13:
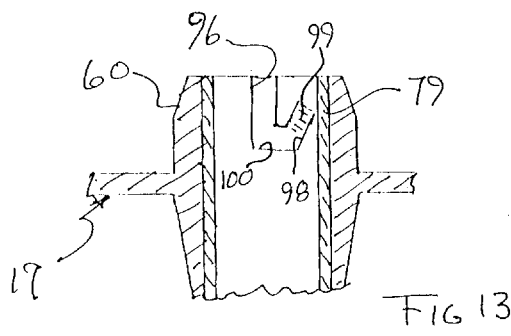
FIG. 13 is a fragmentary sectional view showing a portion of a base with which the shaft of FIG. 12 may be assembled.
Figure 14:
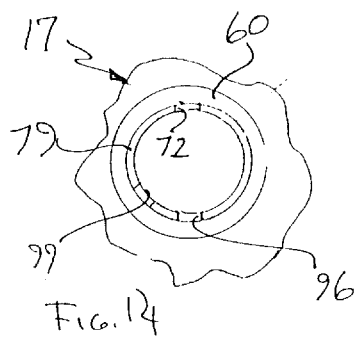
FIG. 14 is a fragmentary plan view of a portion of the base of FIG. 13.

A modification of the arrangement shown in FIGS. 9 through 11 is depicted in through FIGS. 12 and 14, and comprises a supplemental J-shaped slot formed in the sleeve 79, and a second cooperating stud 92 affixed on the shaft 83. As can be seen in FIG. 12, the second stud 92 is positioned diametrically of the stud 90 and upwardly therefrom along the length of the plug 81, and it has a bevelled end face 94 which is inclined toward the axis of the shaft 83.

The supplemental J-shaped slot is similarly positioned in a 180° relationship to the first slot, and upwardly therefrom along the length of the sleeve insert 79. It consists of relatively long and relatively short legs 96, 98 respectively, connected by a circumferential section 100 (which of course lies closer to the mouth of sleeve 79 than the corresponding section 73 of the first J-shaped slot). The outer limit (in a radial sense) of the shorter leg 98 is defined by a small ramp element that provides a surface 99 which slopes inwardly and upwardly. When the ramp surface 99 is contacted by the face 94 of the stud 92 a wedging action occurs as the stud moves upwardly therealong, tightening the joint and serving to secure the shaft against undesired movement.

Although the best mode for practicing the invention, as presently contemplated, employs a base that is of one-piece metal construction and that has depending rubber feet for ground contact, a hollow plastic body, filled with water, sand or other ballast material, and designed to rest directly on the floor, might for example be substituted in appropriate circumstances. Other elements for adding and distributing weight may be employed in place of the three-pointed star structure described and, while the anti-rotation arrangements disclosed are regarded to be optimal, functionally equivalent mechanisms may well occur to those skilled in the art and are deemed to fall within the broad scope of the present invention. Similarly, the character of the shaft employed, and the nature of any incorporated clutch, is not intended to be limited by the description provided, albeit an anti-rotation feature is employed to particular advantage when the clutch is operated by a rotated collar, or the like. Other modifications encompassed within the scope of the appended claims will undoubtedly occur to those skilled in the art.

Thus it can be seen that the present invention provides a novel base for a stand, and a novel stand assembly utilizing such a base, wherein a high degree of stability (sufficient, in some instances, to enable a short boom or lateral arm to be supported by the stand assembly), close approach, and facile lateral stacking are enabled. The absence of any substantial overhang, extending beyond the closed imaginary geometric figure defined by the ground-engaging elements of the base, is fundamental to the stability afforded. The shorter and longer peripheral edges on the base permit comfortable spacing and ready accommodation of the feet of a user straddling the stand assembly, for close approach, and they uniquely enable compact stacking against adjacent such bases for optimal set-up arrangements. Assembly and disassembly of a shaft with and from the base are relatively quick and easy, and tendencies for damage to occur to component parts, especially to thread elements, are significantly reduced.

Having thus described the invention, what is claimed is:

1. A stand assembly comprising a ground-engaging base, a shaft, and means for attaching said shaft to said base, said base being comprised of a base member of modified hexagonal peripheral configuration, symmetrical about each of three axes mutually angularly spaced by 120°, and said peripheral configuration being comprised of three rectilinear longer edges, of a first length, and three interposed shorter edges, of a second length, one of said longer edges lying substantially perpendicular to each of said axes; said means for attaching comprising a normally upwardly opening aperture, defined in said base member substantially at the intersection of said axes, and an end portion of said shaft dimensioned and configured for engagement within said base member aperture, said end portion of said shaft, and sidewall structure of said base member defining said aperture, being matingly threaded; said stand assembly additionally including anti-rotation means for releasably interengaging said shaft to prevent said shaft from inadvertently unscrewing from said base member.

2. The stand assembly of claim 1 wherein said shaft comprises a tubular member and a threaded metal plug, said plug being affixed to said tubular member to provide said end portion.

3. The stand assembly of claim 1 wherein said anti-rotation means comprises a unidirectional ratchet mechanism including a manually operated release-actuating member accessible on said base member.

4. The stand assembly of claim 1 wherein said shaft comprises a plurality of telescopically interengaged sections and clutch means for releasably affixing said sections in positions of relative extension, said clutch means including an operating member that is rotatable, on said shaft sections, in the direction of unscrewing of said shaft from said base, for release of said sections for relative telescopic movement.

* * * * *